United States Patent [19]
Anderson

[11] 3,920,269
[45] Nov. 18, 1975

[54] SELF-LOCKING CONNECTOR

[75] Inventor: Franklin T. Anderson, Bernardsville, N.J.

[73] Assignee: Co-Operative Industries, Inc., Chester, N.J.

[22] Filed: May 28, 1974

[21] Appl. No.: 473,432

[52] U.S. Cl. .................................. 285/84; 285/321
[51] Int. Cl.² .......................................... F16L 15/00
[58] Field of Search ............ 285/81, 84, 85, 86, 91, 285/321, 82; 339/DIG. 2, 89 R, 89 M

[56] References Cited
UNITED STATES PATENTS

| | | | |
|---|---|---|---|
| 660,225 | 10/1900 | Smith .................................. | 285/84 |
| 986,818 | 3/1911 | Graham .............................. | 285/84 |
| 2,031,878 | 2/1936 | Couta .................................. | 285/84 |
| 3,207,535 | 9/1965 | Wilson ................................. | 285/86 |
| 3,343,852 | 9/1967 | Blight et al. ....................... | 339/89 M |
| 3,385,613 | 5/1968 | McCall ................................ | 285/84 |
| 3,422,390 | 1/1969 | Tucker ................................. | 285/85 X |
| 3,552,777 | 1/1971 | Heinrich et al. ...................... | 285/81 |
| 3,646,495 | 2/1972 | Cowmeadow ...................... | 339/DIG. 2 |
| 3,808,580 | 4/1974 | Johnson .............................. | 339/DIG. 2 |

Primary Examiner—Dave W. Arola
Attorney, Agent, or Firm—Thomas N. Neiman

[57] ABSTRACT

The connector comprises a body which rotatively receives a threaded coupling nut, and slidably receives an annular retainer. A spherical-keying arrangement prevents rotary movement between the retainer and body, and the retainer houses a pair of spring-loaded balls for forceably locking the coupling nut against rotation about the body. The coupling nut has an undulated radial surface which receives the balls to effect the rotation locking. The arrangement is so designed as to effect the locking with a substantially unvariable, resilient force.

8 Claims, 5 Drawing Figures

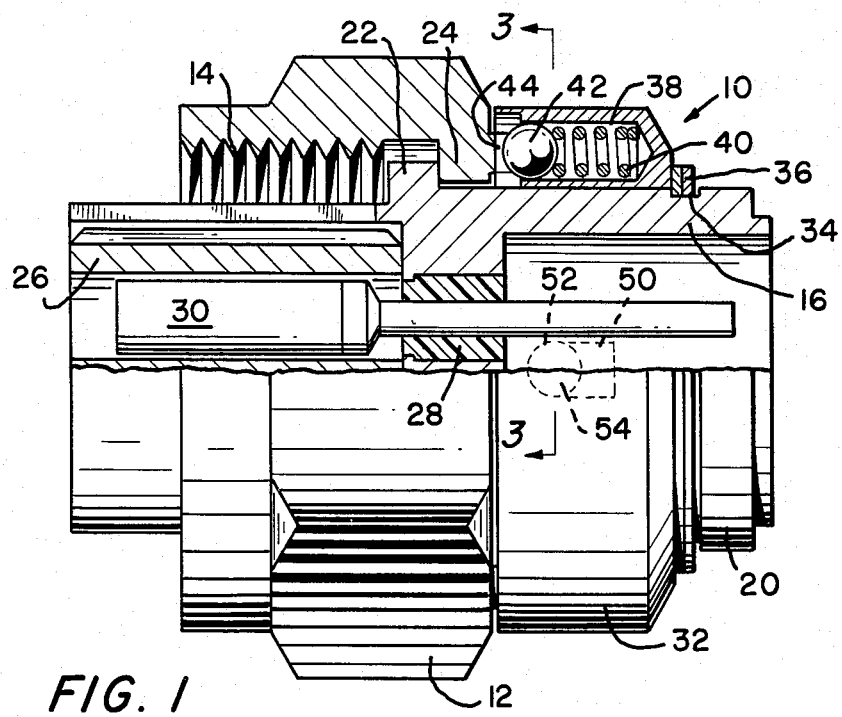
FIG. 1
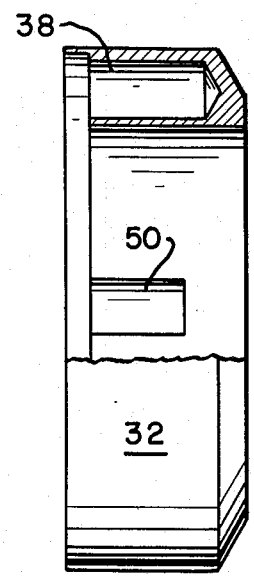
FIG. 2
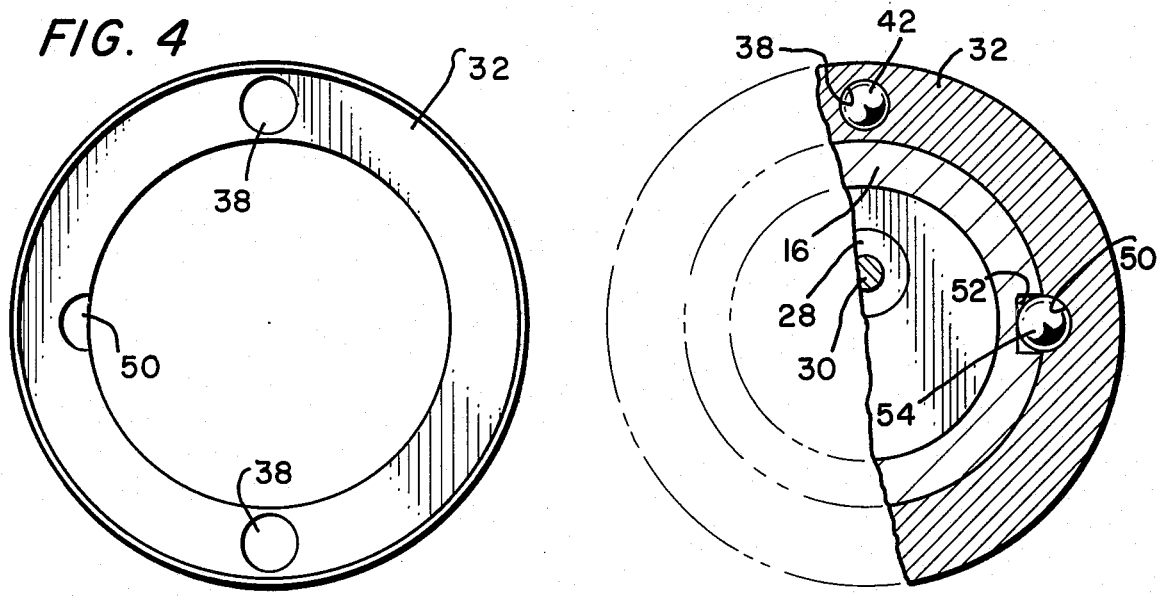
FIG. 4
FIG. 3
FIG. 5

SELF-LOCKING CONNECTOR

This invention pertains to connectors, and in particular to self-locking connectors which are designed to prevent inadvertent uncoupling of the connector and its mating coupling element.

The prior art is replete with self-locking connectors, but in virtually every one the structures require that the connector be threadedly engaged with its mating coupling element with a progressively increased torque. This is so that the locking means, whatever they may be, will effect a varying and increasing locking force.

Typical of such prior art connectors, for instance, is that comprised by U.S. Pat. No. 3,552,777, issued 5 Jan. 1971, to L. O. Heinrich et al., for a "Self-Locking Device for Couplings". In this reference, an annular wave spring is employed to effect the locking force, the force being variable and being proportional to the torque applied to the connector and its mating coupling element.

Where prior art connectors employ an escalating locking force, they are subject to early mortality. Clearly, when there is any question as to whether or not a connector and its mating coupling element are sufficiently coupled, one needs only torque the two with an unquestionable great force. However, this leaves the mating threads under a severe tension all the while the two elements are thus engaged. Accordingly, the threads abrade and fracture all too soon under this classic type of use.

It is something of a fallacy to design connectors for high torque coupling with a mating coupling element, especially in electrical connectors and coupling elements. Typically, there is sufficient, good and positive electrical conductivity established between the interengaging electrical components of a connector and its mating element when the threaded coupling of the latter two are only loosely threadedly engaged. Where the connector is to be of the self-locking type, it is deemed more prudent and practical to build-in sufficient self-locking in the structure, a self-locking which needs not rely on the degree of torque arising between the coupling members, to prevent early mortality of the members due to unwarranted straining of the threads thereof.

Simply stated, what has been needed is a self-locking connector which has built into it a substantially unvariable locking force for insuring against decoupling of its mating member, so that the connector and its mating member may be lightly — or even loosely — threadedly engaged.

It is an object of this invention, then, to set forth an improved self-locking connector.

It is another object of this invention to teach a self-locking connector which has no need to rely upon the torque with which it is engaged with a mating coupling element to enhance its locking force and reliability.

It is a particular object of this invention to disclose an improved self-locking connector comprising a coupling member; said member having an axis, and being threaded along an axially-extending surface thereof for threaded coupling engagement with a mating element; a body member; said coupling and body members being engaged for relative rotation therebetween; means retaining said body and coupling members in engagement; and means interposed between said retaining means and one of said body and coupling members for constraining said body and coupling members against relative rotation with a substantially unvariable, resilient force.

A feature of this invention comprises a body which rotatively receives a threaded coupling nut, and slidably receives an annular retainer. A spherical-keying arrangement prevents rotary movement between the retainer and body, and the retainer houses a pair of spring-loaded balls for forceably locking the coupling nut against rotation about the body. The coupling nut has an undulated radial surface which receives the balls to effect the rotation locking. The arrangement is so designed as to effect the locking with a substantially unvariable, resilient force.

Further objects and features of this invention will become more apparent by reference to the following description taken in conjunction with the accompanying figures, in which:

FIG. 1 is a side, elevational view, partly in cross-section, of an embodiment of a self-locking connector according to the invention;

FIG. 2 is a side, elevational view, partly in cross-section, of the retainer of the FIG. 1 embodiment;

FIG. 3 is a partial view of the novel connector, half thereof being shown in cross-section (taken generally along 3—3 of FIG. 1);

FIG. 4 is a front, elevational view of the retainer viewed from the left-hand side of FIG. 2; and FIG. 5 is a fragmentary view of the undulated radial surface of the coupling nut, the same being a side elevational view — shown in a flat plane — greatly enlarged over the scale of FIG. 1.

As shown in FIG. 1, the improved self-locking connector 10, here depicted by way of example as an electrical connector, comprises a coupling nut 12 having an axially-threaded surface 14 for threadedly and couplingly engaging a mating coupling element. The nut 12 is rotatably engaged with a body 16, the nut having an aperture 18 for coaxially engaging an outer diameter 20 of the body. The body 16 and nut 12 have radial flanges 22 and 24, respectively, which abut to prevent the nut from sliding free of the body at one end thereof.

The body carries an insert 26 and beads 28 with electrical inserts 30 (only one of each being shown) according to practices well known in the art. Thus, further discussion of these components, which have little bearing on the novelty of the connector 10, is considered to be unnecessary.

A retainer 32 defined as an annulus is slidably and coaxially received about diameter 20 of the body 16. The retainer has an annular groove 34 formed therein which receives a resilient retaining ring 36; thus, ring 36 secures retainer 32 in position on body 16, and the latter, in turn, secures the nut 12 in place.

Retainer 32 has a pair of bores 38, as better shown in FIGS. 2, 3 and 4, formed axially therein which receive helical compression springs 40 (only one being shown). Each spring bears at one end in the closed bottom of a bore 38 and, at the other end bears against a ball 42. Each spring 40 and ball 42 cooperate with an undulated radial surface 44 formed on the nut 12 to operate as locking detents. The side, elevational and fragmentary view of the surface 44 of nut 12, in FIG. 5 shows the cooperation of the ball(s) 42 with recesses 46 and intervening peaks or prominences 48. In this embodiment, the balls 42 have a diameter of 0.093-inch, and the recesses 46 have a depth of 0.035-inch. In alternate embodiments other relative dimensions may be found practical, however it is a teaching of this invention to have the depth of the recesses less than half the diameter of the balls — this to facilitate a displacement of the balls from one recess 46 to another adjacent thereto. When half or more of detent balls are nested in recesses, it requires undue force to displace them. It is clear that the detenting effect arises from the resilient force with which the balls are restrained in the recesses, and not so much from the depth to which the balls are nested.

The body 16 and retainer 32 are secured against relative rotation therebetween by means of a ball-key arrangement which is best seen by reference to FIGS. 2, 3 and 4. The retainer 32 has an axially-extending groove 50 formed in an inner wall surface thereof, the groove having a hemispheric cross-section. Body 16 has a radial bore 52 formed therein. Now then, when coupled together, with retainer 32 slidably engaged with diameter 20 of the body 16, the groove 50 and bore 52 interface and enclose therebetween a keying ball 54 (shown in phantom outline in FIG. 1). Thus, the body 16 and retainer 32 are locked together, preventing rotation of one relative to the other.

Simply by withdrawing the retaining ring 36 from the annular groove 34, the retainer 32 — with the detent springs 40 and balls 42, and the nut 12 can all be slid off the body 16 from the end thereof opposite the 1½ 22.

This novel connector 10 has a full, efficient, and substantially unvariable locking force built into it. It is of no consequence how greatly nut 12 is torqued into threaded engagement with a mating coupling element, the nut 12 is restrained against rotation relative to body 16 with a substantially constant force. In this particular embodiment the balls 42 are urged against the undulated radial surface 44 of the nut 12 with a force of between 1 ½ and 4 inch-pounds, approximately — and this force (wear, and spring fatigue aside) neither increases nor diminishes. This built-in efficient locking force will prevent inadvertent uncoupling of the connector 10 from a mating coupling element, even if the two elements are but loosely, threadedly engaged, and requires no undue tensioning of the interengaging threads to preserve the coupling.

While the invention has been described in connection with a specific embodiment thereof, it is to be clearly understood that this is done only by way of example and not as a limitation to the scope of the invention as set forth in the objects thereof and in the appended claims.

I claim:

1. A self-locking connector, comprising:
a coupling member;
said member having an axis, and being threaded along an axially-extending surface thereof for threaded engagement with a mating coupling element;
a body member;
said coupling and body members being engaged for relative rotation therebetween;
means retaining said body and coupling members in engagement; and
means interposed between said retaining means and one of said body and coupling members for resiliently restraining said body and coupling members against relative rotation with a substantially unvariable, resilient force; wherein
said retaining means comprises an annulus;
said annulus and said body member are coaxially and slidably engaged;
said annulus has a plurality of bores axially formed therein;
said coupling member has an undulated radial surface formed thereon; and
said restraining means comprises detent means nested in said bores of said plurality thereof for lockingly engaging said undulated radial surface of said coupling member.

2. A connector, according to claim 1, wherein:
said restraining means includes means for applying said force to said retaining means and said one member in an axial direction.

3. A connector, according to claim 1, wherein:
said retaining means and one of said body and coupling members are coaxially and slidably engaged; and further including
means interposed between said retaining means and said one member preventing relative rotation between said retaining means and said one member.

4. A connector, according to claim 1, wherein:
said detent means comprise a helical compression spring in each of said bores and a ball interposed between each of said springs and said undulated radial surface;
said undulated radial surface being formed of a series of recesses each of which is separated from another thereof by intervening prominences; and
each of said recesses has a depth of less than half the diameter of said balls.

5. A connector, according to claim 4, further including:
a spherical element interposed between said annulus and body member to prevent relative rotation between said annulus and body member.

6. A connector, according to claim 5, wherein:
said body member has a radial bore formed therein;
said annulus has an axially extending groove formed therein; and
said spherical element is enclosed by said radial bore and said groove.

7. A connector, according to claim 6, wherein:
said spherical element has a constant diameter;
said radial bore has a depth of substantially half said constant diameter; and
said groove is hemispheric in cross-section and has a depth substantially equal to said depth of said radial bore.

8. A connector, according to claim 7, wherein:
said body member further has an annular groove formed therein; and further including
a resilient retaining ring removably engaged with said annular groove;
said resilient retaining ring having a surface thereof engaging a surface of said annulus to secure said annulus in position in coaxial engagement with said body member; and wherein
said annulus, detent means, said spherical element and said coupling member are all slidably disengageable from said body member upon removal of said retaining ring from said annular groove.

* * * * *